(12) United States Patent
Ai et al.

(10) Patent No.: US 10,788,707 B2
(45) Date of Patent: Sep. 29, 2020

(54) CURVED DISPLAY DEVICE WITH ARC-SHAPED FIXING MEMBERS

(71) Applicant: InnoLux Corporation, Jhu-Nan, Miao-Li County (TW)

(72) Inventors: Kun-Chih Ai, Jhu-Nan (TW); Ta-Chin Huang, Jhu-Nan (TW)

(73) Assignee: INNOLUX CORPORATION, Miao-Li County (TW)

( * ) Notice: Subject to any disclaimer, the term of this patent is extended or adjusted under 35 U.S.C. 154(b) by 382 days.

(21) Appl. No.: 15/483,590

(22) Filed: Apr. 10, 2017

(65) Prior Publication Data
US 2017/0315407 A1 Nov. 2, 2017

(30) Foreign Application Priority Data

Apr. 29, 2016 (CN) .......................... 2016 1 0279365

(51) Int. Cl.
*G02F 1/13357* (2006.01)
*G02F 1/1333* (2006.01)

(52) U.S. Cl.
CPC .... *G02F 1/133608* (2013.01); *G02F 1/13338* (2013.01); *G02F 1/133308* (2013.01); *G02F 1/133605* (2013.01); *G02F 2001/13332* (2013.01); *G02F 2001/133314* (2013.01)

(58) Field of Classification Search
CPC ... G02F 1/133308; G02F 2001/133314; G02F 2001/1333; G02F 2001/133317; G02F 2001/133328; G02F 1/133603; G02F 1/133608
See application file for complete search history.

(56) References Cited

U.S. PATENT DOCUMENTS

| 4,825,212 | A  | * | 4/1989  | Adler  | G06F 3/0436   |
|           |    |   |         |        | 310/313 A     |
| 8,345,415 | B2 | * | 1/2013  | Choi   | H04N 5/64     |
|           |    |   |         |        | 248/917       |
| 8,698,972 | B2 | * | 4/2014  | Kim    | G02F 1/1333   |
|           |    |   |         |        | 349/58        |
| 9,261,720 | B2 | * | 2/2016  | Lee    | G02B 6/0093   |
| 9,323,086 | B2 | * | 4/2016  | Hsiao  | G02F 1/133308 |
| 9,483,964 | B2 | * | 11/2016 | Choi   | G09F 9/30     |
| 9,629,238 | B2 | * | 4/2017  | Lee    | G02F 1/133308 |

(Continued)

FOREIGN PATENT DOCUMENTS

| CN | 103323969 A | 9/2013 |
| CN | 104977752 A | 10/2015 |

*Primary Examiner* — Ismael Negron
(74) *Attorney, Agent, or Firm* — Muncy, Geissler, Olds & Lowe, P.C.

(57) ABSTRACT

A display device includes a first arc-shaped fixing member, a second arc-shaped fixing member, an optical element, an optical film assembly and a display panel. The first arc-shaped fixing member is disposed corresponding to the second arc-shaped fixing member, and the second arc-shaped fixing member is connected to the edge of the first arc-shaped fixing member. The optical element is disposed between the first arc-shaped fixing member and the second arc-shaped fixing member so as to form a curve surface. The optical film assembly is disposed adjacent to the optical element. The display panel is disposed corresponding to the second arc-shaped fixing member and located at one side of the second arc-shaped fixing member away from the optical element.

19 Claims, 9 Drawing Sheets

(56) References Cited

U.S. PATENT DOCUMENTS

| | | | |
|---|---|---|---|
| 9,632,235 B2* | 4/2017 | An | G02F 1/133308 |
| 9,823,508 B2* | 11/2017 | Kang | G02F 1/133308 |
| 9,894,766 B2* | 2/2018 | Park | H05K 1/142 |
| 9,898,975 B2* | 2/2018 | Jang | G02F 1/133305 |
| 10,031,358 B2* | 7/2018 | Nishimoto | G02F 1/133305 |
| 10,132,991 B2* | 11/2018 | Jeon | G02B 6/0088 |
| 10,459,267 B2* | 10/2019 | Yamakawa | G02F 1/133308 |
| 2015/0168784 A1* | 6/2015 | Asada | G02F 1/133608 349/61 |
| 2015/0248858 A1* | 9/2015 | Ahn | G06F 1/1601 345/82 |
| 2016/0103366 A1* | 4/2016 | Chen | G02F 1/133603 362/97.3 |
| 2016/0120043 A1* | 4/2016 | Kim | B32B 5/02 362/97.1 |
| 2018/0137826 A1* | 5/2018 | Jang | F21V 23/001 |

\* cited by examiner

CURVED DISPLAY DEVICE WITH ARC-SHAPED FIXING MEMBERS

CROSS REFERENCE TO RELATED APPLICATIONS

This Non-provisional application claims priority under 35 U.S.C. § 119(a) on Patent Application No(s). 201610279365.1 filed in People's Republic of China on Apr. 29, 2016, the entire contents of which are hereby incorporated by reference.

BACKGROUND

Technical Field

The disclosure relates to a display device and, in particular, to a curved display device.

Related Art

With the development of technologies, flat display devices have been widely applied to various fields. Due to the advantages such as low power consumption, less weight, compact size and less radiation, the liquid crystal display (LCD) devices have gradually replaced the traditional cathode ray tube display (CRT) display devices and been applied to various electronic products, such as mobile phones, portable multimedia devices, notebook computers, liquid crystal TVs and liquid crystal screens.

In order to satisfy the requirements of customers, the manufacturers have putted a lot of efforts into the development of novel display device. Accordingly, the curved display device has been disclosed. The developers believe that the distances between different points of the screen of the curved display device and the eyes are similar, so that the viewers can have a viewing angle with good surrounding feeling.

A conventional curved display device has a back plate structure configured by a curved supporter and at least one arc frame, and the display panel is fixed on the back plate structure so as to maintain the desired curved status. In this case, the single arc frame is screwed on the curved supporter by fixing elements. Alternatively, it is also possible to provide a plurality of small-sized arc frames, which are stacked and connected and then fixed on the curved supporter. The arc frame is the major component responding for the strength of the back plate structure, and the curved supporter can assist partial strength thereof.

In addition, it is also possible to utilize a curved bracket and a plurality of fixing members, which are combined into the back plate structure, for fixing the display panel. Thus, the display panel can show the desired curved status. In this case, the fixing members can apply forces on the planar back plate of the display panel, so that the planar back plate can be deformed and attached to the curved bracket. The curved bracket can provide the major strength for the curved supporting structure and the curved display device.

However, the back plate structure of the conventional curved display device is mostly composed of many components, such as the curved supporter and at least one arc frame, or the curved bracket and a plurality of fixing members. The amount of the components are quite large and the assembling procedure is very complex. Besides, the components of the back plate structure are generally formed by the stamping process or pipe bending process. Unfortunately, when manufacturing the arc components by the stamping process, the issues of rebound and poor precisely control may occur. In addition, utilizing the pipe bending process to fabricate the curved bracket is easier, but it is difficult to precisely assemble the components.

SUMMARY

An objective of the disclosure is to provide a curved display device that has less supporting components and is easily assembled.

To achieve the above objective, the present disclosure discloses a display device including a first arc-shaped fixing member, a second arc-shaped fixing member, an optical element, an optical film assembly, and a display panel. The second arc-shaped fixing member is disposed corresponding to the first arc-shaped fixing member, and the second arc-shaped fixing member is connected to an edge of the first arc-shaped fixing member. The optical element is disposed between the first arc-shaped fixing member and the second arc-shaped fixing member so as to form a curve surface. The optical film assembly is disposed adjacent to the optical element. The display panel is disposed corresponding to the second arc-shaped fixing member and located at one side of the second arc-shaped fixing member away from the optical element.

As mentioned above, in the display device of this disclosure, the second arc-shaped fixing member is connected to the edge of the first arc-shaped fixing member, and the optical element is disposed between the first arc-shaped fixing member and the second arc-shaped fixing member so as to form a curved surface. In addition, the optical film assembly is disposed adjacent to the optical element, and the display panel is disposed corresponding to the second arc-shaped fixing member and located at one side of the second arc-shaped fixing member away from the optical element. Compared with the conventional display device, the display device of this disclosure has less supporting components and is easily assembled.

BRIEF DESCRIPTION OF THE DRAWINGS

The embodiments will become more fully understood from the detailed description and accompanying drawings, which are given for illustration only, and thus are not limitative of the present disclosure, and wherein.

DETAILED DESCRIPTION

The embodiments of the disclosure will be apparent from the following detailed description, which proceeds with reference to the accompanying drawings, wherein the same references relate to the same elements. Moreover, the drawings of all implementation are schematic, and they do not mean the actual size and proportion. The terms of direction recited in the disclosure, for example up, down, left, right, front, or rear, only define the directions according to the accompanying drawings for the convenience of explanation but not for limitation. The names of elements and the wording recited in the disclosure all have ordinary meanings in the art unless otherwise stated. Therefore, a person skilled in the art can unambiguously understand their meanings.

Figure 1A:
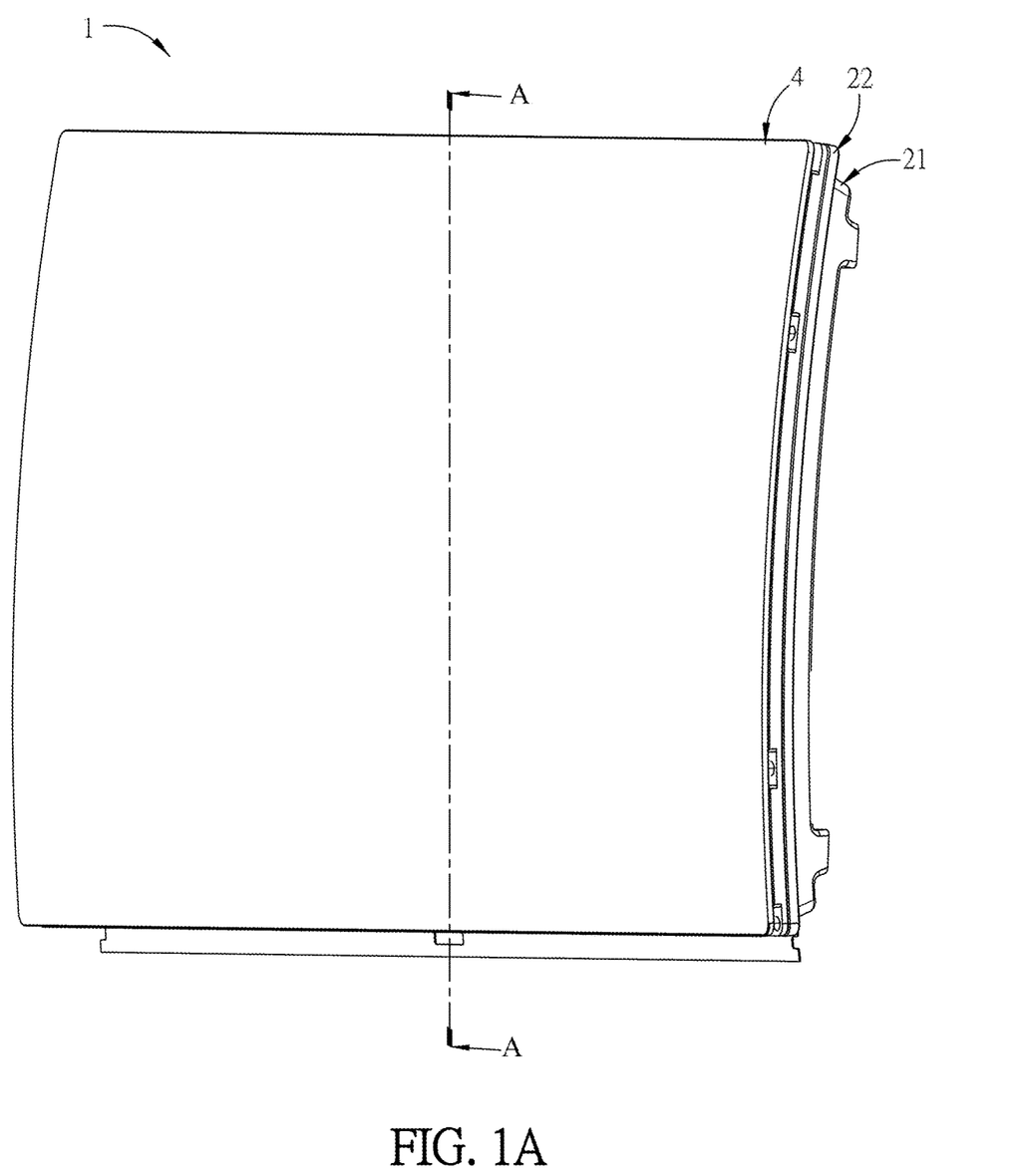
FIG. 1A is a perspective view of a display device according to an embodiment of the disclosure.
Figure 1B:
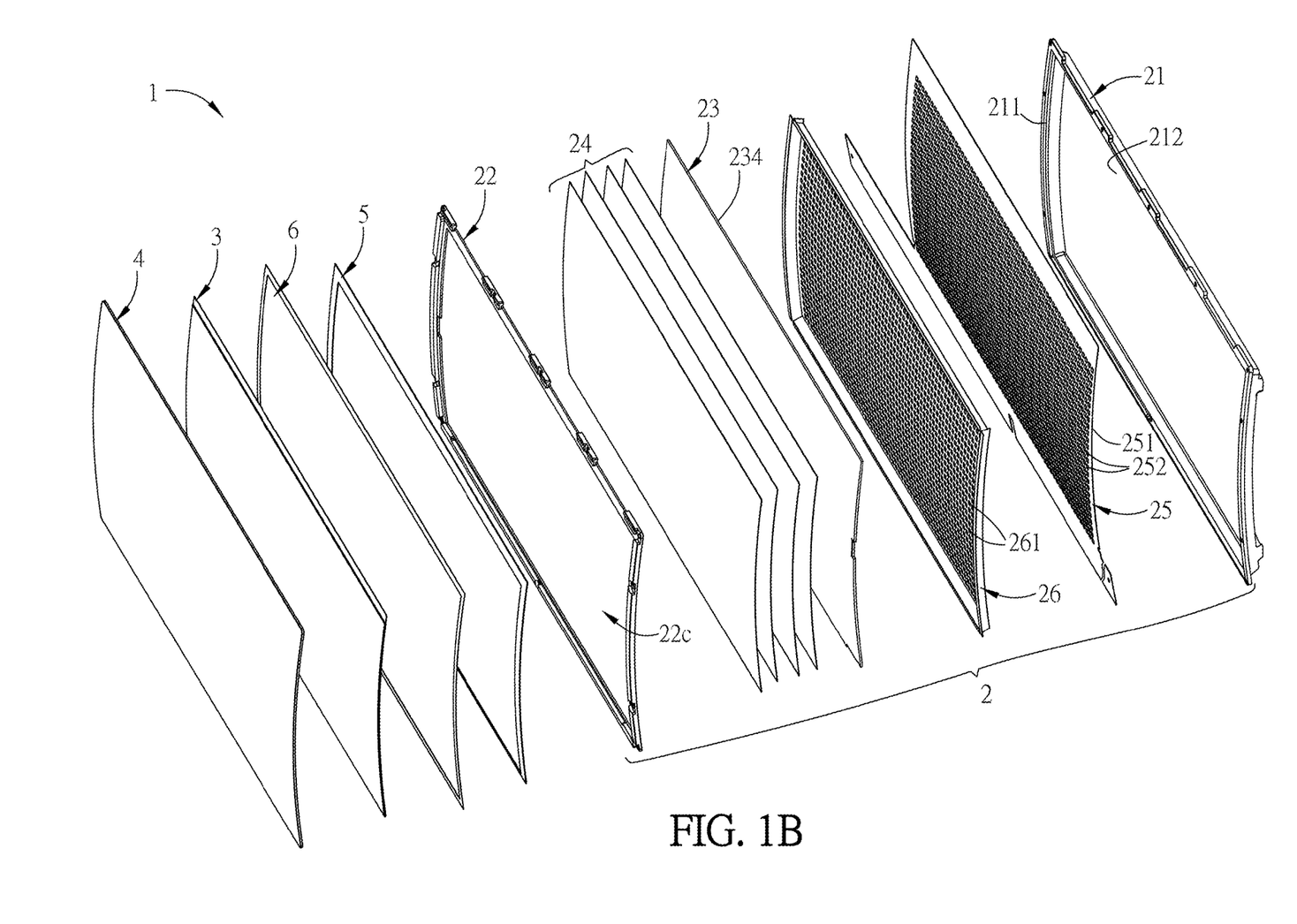
FIG. 1B is an exploded view of the display device of FIG. 1A.
Figure 1C:
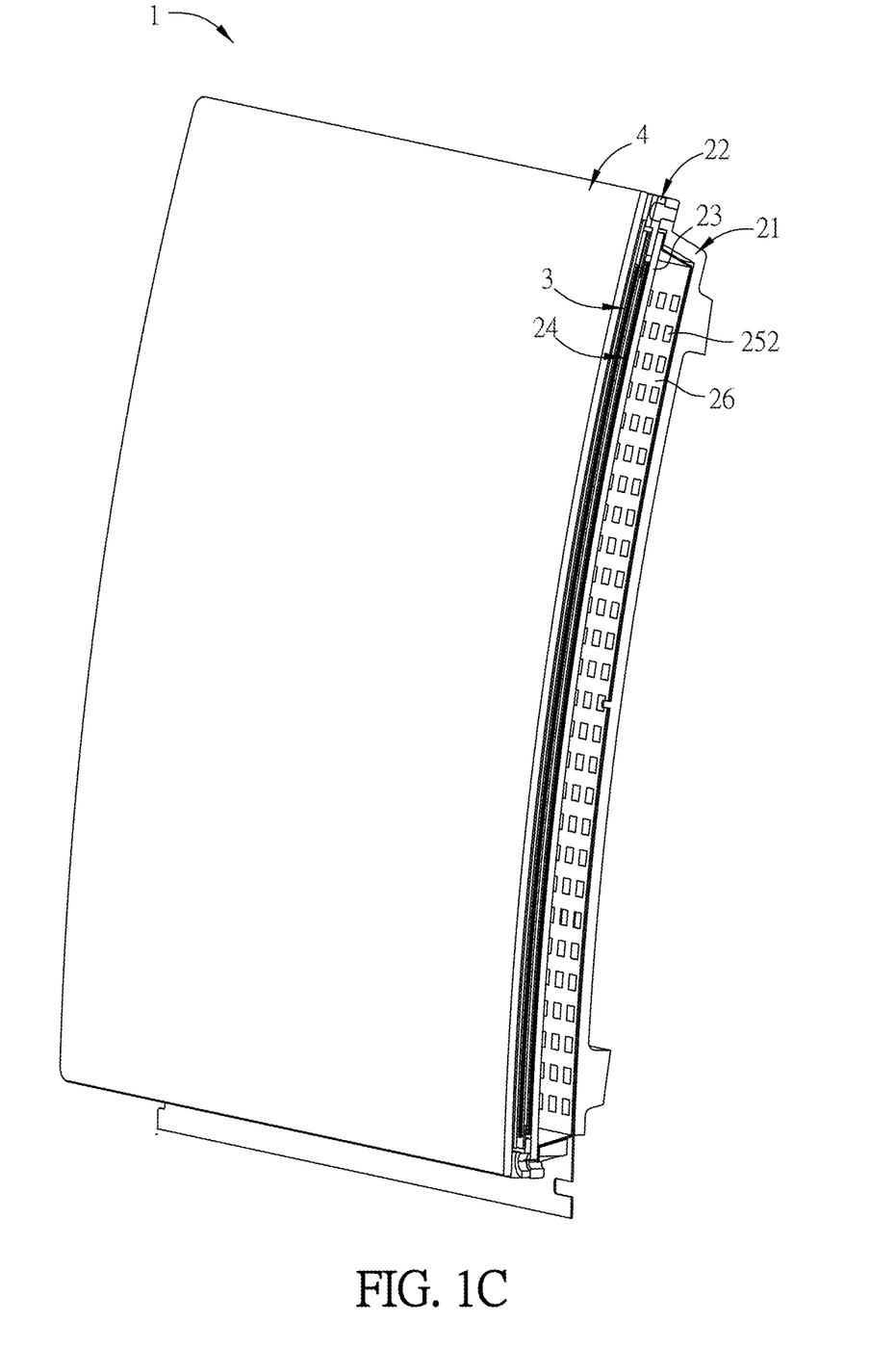
FIG. 1C is a sectional view of the display device of FIG. 1A along the line A-A.
Figure 1D:
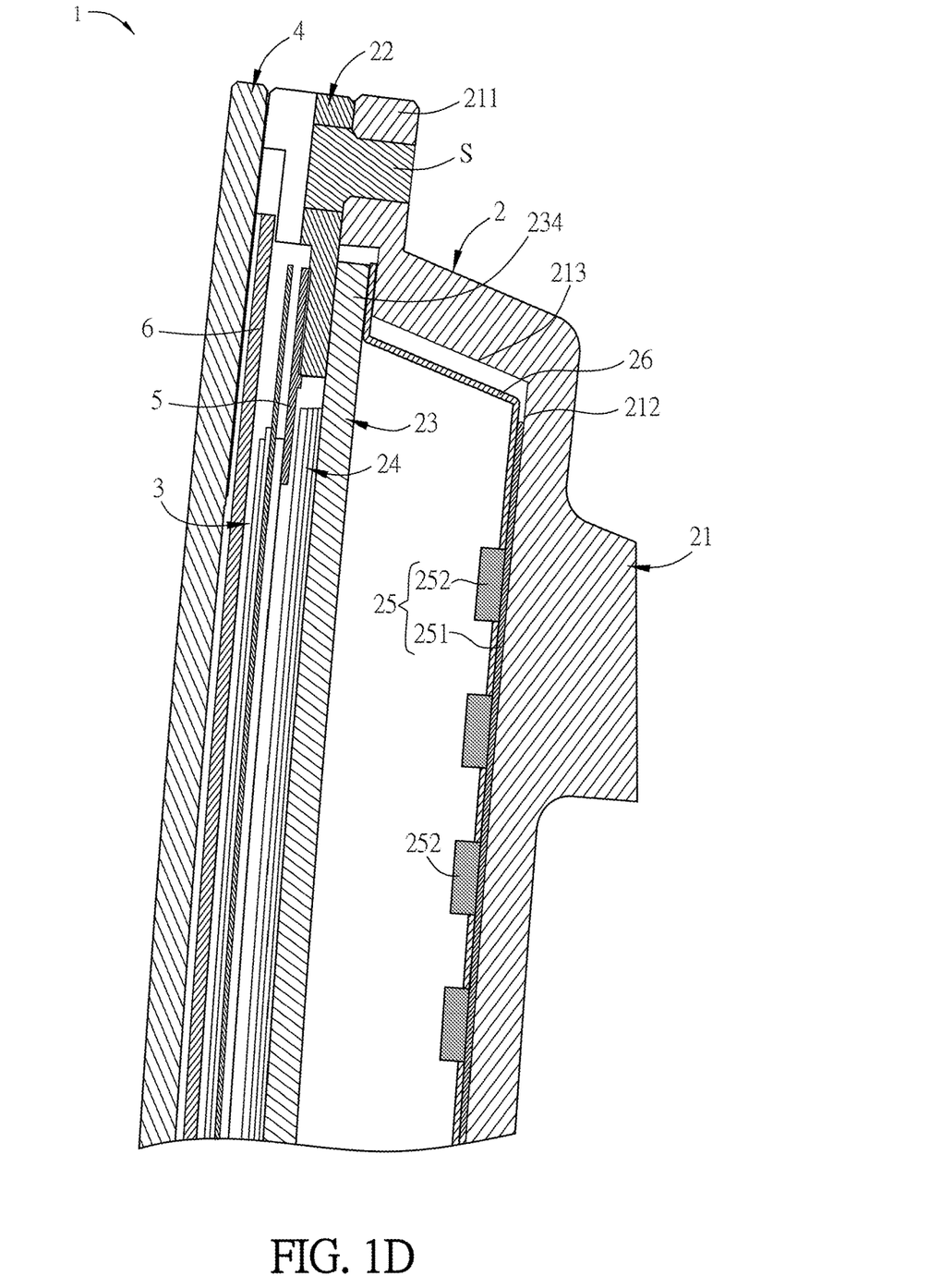
FIG. 1D is a schematic diagram showing an enlarged view of a part of FIG. 1C.
Figure 1E:
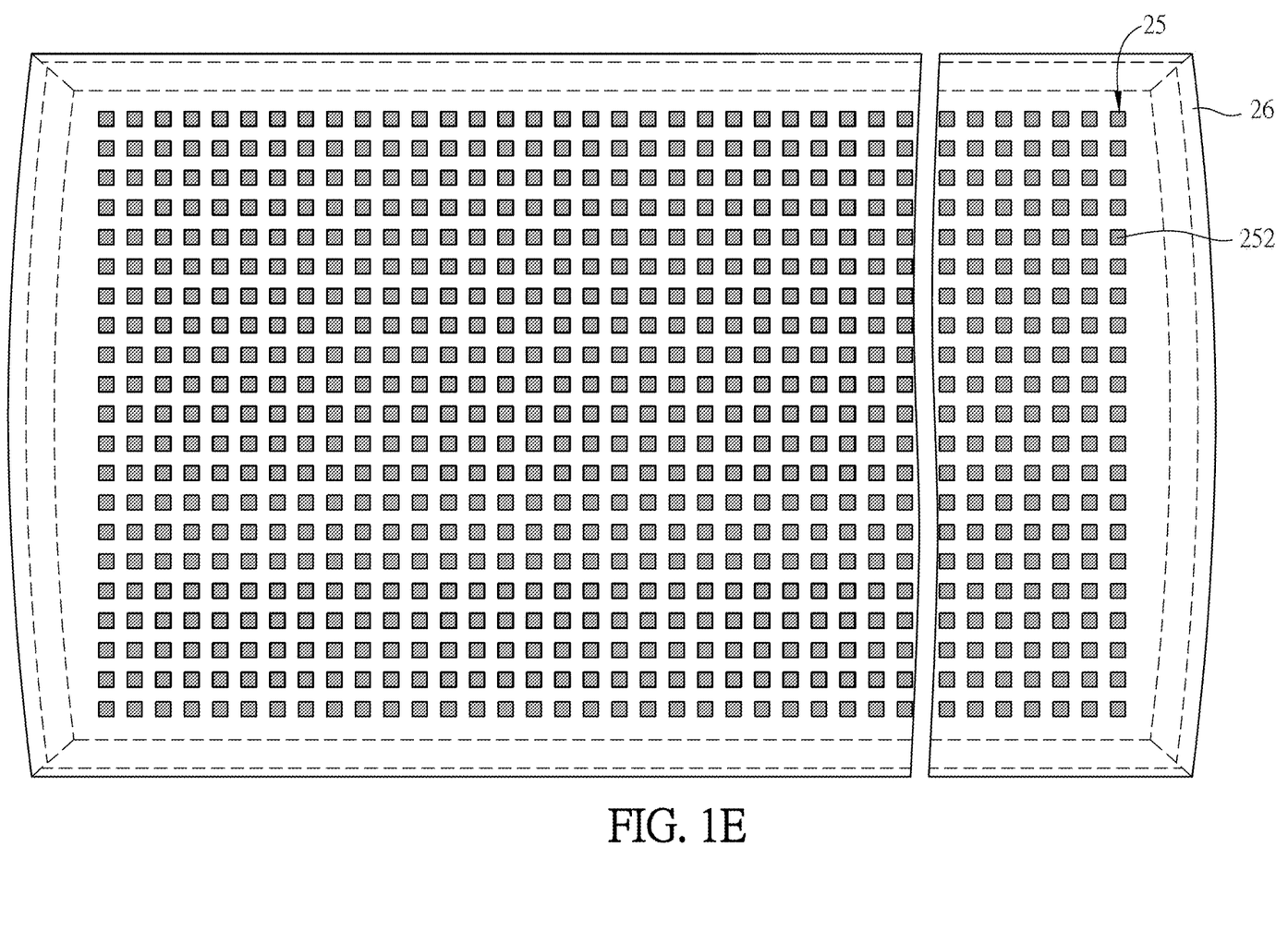
FIG. 1E is a top view of the light emitting unit and the reflective plate of an embodiment.

FIG. 1A is a perspective view of a display device according to an embodiment of the disclosure, and FIG. 1B is an exploded view of the display device of FIG. 1A. FIG. 1C is a sectional view of the display device of FIG. 1A along the line A-A. FIG. 1D is a schematic diagram showing an enlarged view of a part of FIG. 1C. FIG. 1E is a top view of the light emitting unit and the reflective plate of an embodiment.

Referring to FIGS. 1A to 1E, the display device 1 of this embodiment is a curved display device and is, in particular, a convex type curved display device. The "convex type" curved display device has a feature that the center portion of the display surface of the display device 1 is protruded from the peripheral portions thereof for the viewer. Alternatively, the "concave type" curved display device has a feature that the peripheral portions of the display surface of the display device are protruded from the center portion thereof for the viewer.

The display device 1 includes a backlight module 2 and a display panel 3. The backlight module 2 is disposed corresponding to the display panel 3, and is capable of emitting light to the display panel 3. Accordingly, the display panel 3 can display an image. The backlight module 2 of this embodiment is a direct lighting type backlight module, and it is also a convex type backlight module for example. Since the display device 1 is a curved display device, the curvature of the backlight module 2 can match that of the display panel 3. In other words, the curvatures (the changing rate of a tangent angle) of the above components are substantially the same. In some embodiments, due to factors of the manufacturing processes, the curvatures of these components can have a little variations.

The backlight module 2 includes a first arc-shaped fixing member 21, a second arc-shaped fixing member 22, an optical element 23, and an optical film assembly 24. Moreover, the backlight module 2 may further include a light emitting unit 25 and a reflective plate 26.

The second arc-shaped fixing member 22 is disposed corresponding to the first arc-shaped fixing member 21. And the first arc-shaped fixing member 21 and the second arc-shaped fixing member 22 have substantially the same changing rate of a tangent angle. In this embodiment, the first arc-shaped fixing member 21 can function as a supporting member and have an inner bottom surface 212 and a peripheral edge 211 connected to the inner bottom surface 212. The second arc-shaped fixing member 22 is a frame member, which has a hollow center portion 22c. As shown in FIG. 1D, the second arc-shaped fixing member 22 is connected to the peripheral edge 211 of the first arc-shaped fixing member 21. In general, the second arc-shaped fixing member 22 can be connected to the peripheral edge 211 of the first arc-shaped fixing member 21 by, for example but not limited to, screwing (using screws), hooking (using hooks or buckles), or riveting (using rivets). In this embodiment, the second arc-shaped fixing member 22 is connected to the peripheral edge 211 of the first arc-shaped fixing member 21 by a plurality of connectors S (screws).

The material of the first arc-shaped fixing member 21 and the second arc-shaped fixing member 22 can be, for example but not limited to, plastics or metal, they can be manufactured by, for example but not limited to, CNC processing, die casting, stamping, or plastic molding. Accordingly, the first arc-shaped fixing member 21 and the second arc-shaped fixing member 22 can have the same changing rate of tangent angle. In some embodiment, each of the first arc-shaped fixing member 21 and the second arc-shaped fixing member 22 is integrally formed as one piece. Compared with the conventional back plate structure, the changing rate of tangent angle and the dimension precision of the first arc-shaped fixing member 21 and the second arc-shaped fixing member 22 can be precisely controlled. Accordingly, when this technology is applied to the medium and small size curved display devices (e.g. the product for vehicle), the manufactured products can have higher precision.

The optical element 23 is disposed between the first arc-shaped fixing member 21 and the second arc-shaped fixing member 22 so as to form a curve surface. Since the backlight module 2 of this embodiment is a direct lighting backlight module, the optical element 23 is a diffuser, which is made of a transparent material such as, for example but not limited to, acrylic resin, polycarbonate or polyethylene resin. This disclosure is not limited. To be noted, the optical element 23 can be originally a planar plate before being disposed between the first arc-shaped fixing member 21 and the second arc-shaped fixing member 22. Of course, the optical element 23 can originally have a changing rate of tangent angle substantially the same as that of the first arc-shaped fixing member 21 or the second arc-shaped fixing member 22. In this embodiment, the optical element 23 is originally a planar plate and is flexible. Accordingly, when the peripheral edge 234 of the optical element 23 is disposed between the first arc-shaped fixing member 21 and the second arc-shaped fixing member 22, the optical element 23 is shaped into a curved plate. Moreover, this structure can prevent the rebound of the optical element 23 due to the structural stress itself. As a result, the optical element 23 can be a common planar diffuser. In other words, it is unnecessary to manufacture a curved optical element 23 in advance, so that the manufacturing cost and time can be saved.

The optical film assembly 24 is disposed adjacent to the optical element 23. In this embodiment, the size of the optical film assembly 24 is smaller than the center hollow portion 22c of the second arc-shaped fixing member 22. The optical film assembly 24 is disposed on the optical element 23 and is located between the display panel 3 and the optical element 23. For example, the optical film assembly 24 includes four optical films, which can be, for example but not limited to, light collecting films, brightness enhancement films (BEF), or diffusers. Besides, a light shielding member 5 is configured for limiting the optical film assembly 24 on the top surface of the optical element 23. Since the optical element 23 is shaped into a curved plate, the optical films are individually shaped into curved plates with substantially the same changing rate of tangent angle as the optical element 23. In some embodiments, the second arc-shaped fixing member 22 may have a protrusion, which protrudes inwardly, for fixing the optical element 23 on the top surface. In this case, the light shielding member 5 is not needed. In some embodiments, the size of the optical film assembly 24 can be greater than the center hollow portion 22c of the second arc-shaped fixing member 22. And the optical film assembly 24 and the optical element 23 are together disposed between the first arc-shaped fixing member 21 and the second arc-shaped fixing member 22, and the light shielding member 5 is also not needed.

In some embodiments, when the display device 1 is a convex type display device, the length of one of the optical films, which is horizontally placed, is smaller than or equal to the length of another one of the optical films, which is horizontally placed. In some embodiments, when the display device 1 is a concave type display device, the length of one of the optical films, which is horizontally placed, is greater than or equal to the length of another one of the optical films, which is horizontally placed. To be noted, the "length of the optical film, which is horizontally placed," means the length of the optical film while the optical film is laid on a planar plane without applying any additional force on it, so the optical film is a natural planar plate and is not curved. In addition, the "length" means the length of one side of the optical film, which is horizontally placed and is to be curved in the assembled status. To be noted, the side of the optical film to be curved in the assembled status can be the longer side or the shorter side of the optical film. Thus, the length of the optical film is not necessary the length of the longer side of the optical film.

Figure 2A:
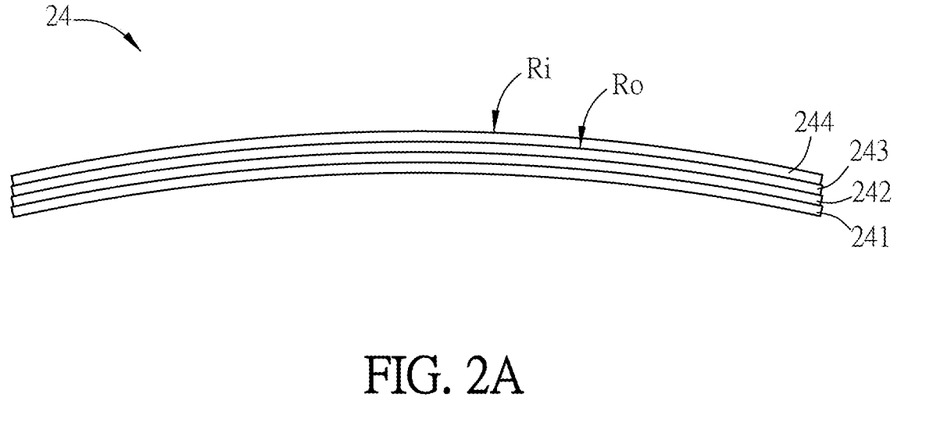
FIGS. 2A and 2B are schematic diagrams showing optical film assemblies of different embodiments.
Figure 2B:
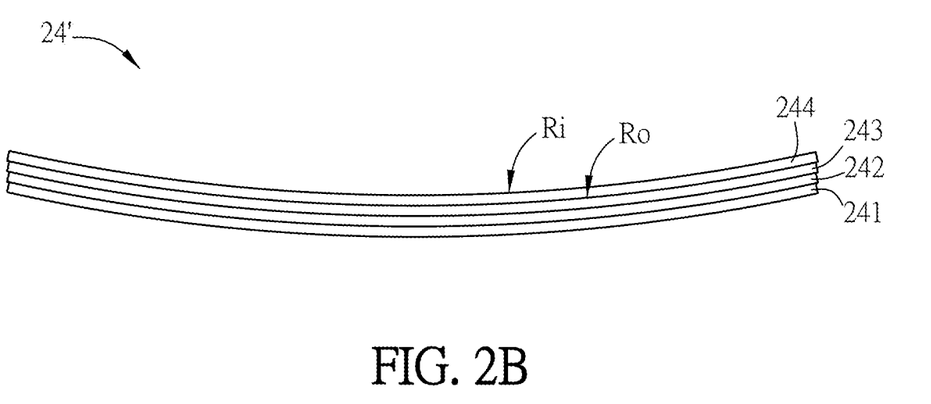

FIGS. 2A and 2B are schematic diagrams showing optical film assemblies of different embodiments.

As shown in FIG. 2A, the optical film assembly 24 includes four stacked optical films, which include a first optical film 241, a second optical film 242, a third optical film 243 and a fourth optical film 244. The optical films 241~244 are convex type. The centers of curvature of the optical films 241~244 are substantially the same, but the radiuses of curvature of the optical films 241~244 are different. In the optical film assembly 24 of FIG. 2A, the viewer is at the top side of the optical film assembly 24, and the optical element 23 is located at the bottom side of the optical film assembly 24. Accordingly, the first optical film 241 is disposed between the optical element 23 and the second optical film 242, the second optical film 242 is disposed between the first optical film 241 and the third optical film 243, and the third optical film 243 is disposed between the second optical film 242 and the fourth optical film 244.

Since the optical films 241~244 are placed on the optical element 23 and are convex type, the length of the first optical film 241, which is horizontally placed, is less than the length of the second optical film 242, which is horizontally placed, the length of the second optical film 242, which is horizontally placed, is less than the length of the third optical film 243, which is horizontally placed, and the length of the third optical film 243, which is horizontally placed, is less than the length of the fourth optical film 244, which is horizontally placed. This configuration can prevent the light leakage issue at two sides of the optical film assembly 24. In other words, the optical film located closer to the viewer has a side with a longer length (as the optical film is horizontally placed). That is, the side of the fourth optical film 244 has the longest length.

Taking the third optical film 243 and the fourth optical film 244 as an example, if the fourth optical film 244, which is horizontally placed, has a length of L, the third optical film 243, which is horizontally placed, has a length of L+L×(Ro/Ri−1). Herein, Ri is the radius of curvature of the fourth optical film 244, and Ro is the radius of curvature of the third optical film 243. Of course, the lengths of other optical films (e.g. the optical films 241~242) can fit the above equation. According the above design, the light leakage issue at two sides of the optical film assembly 24 can be prevented.

In another embodiment, as shown in FIG. 2B, the display device is a concave type display device. The optical films 241~244 are disposed on the optical element 23, and they are concave type. In the optical film assembly 24' of FIG. 2B, the viewer is at the top side of the optical film assembly 24', and the optical element 23 is located at the bottom side of the optical film assembly 24'. Since the optical films 241~244 are concave type, the length of the first optical film 241, which is horizontally placed, is greater than the length of the second optical film 242, which is horizontally placed, the length of the second optical film 242, which is horizontally placed, is greater than the length of the third optical film 243, which is horizontally placed, and the length of the third optical film 243, which is horizontally placed, is greater than the length of the fourth optical film 244, which is horizontally placed. This configuration can prevent the light leakage issue at two sides of the optical film assembly 24'. In other words, the optical film located closer to the viewer has a side with a shorter length (as the optical film is horizontally placed). That is, the side of the fourth optical film 244 has the shortest length. The description of lengths of the optical films 241~244 can be referred to the above embodiment, so the detailed description thereof will be omitted.

Referring to FIGS. 1B and 1D, the display panel 3 is disposed corresponding to the second arc-shaped fixing member 22 and is located at one side of the second arc-shaped fixing member 22 away from the optical element 23. In this embodiment, the display panel 3 is an LCD panel, which has two opposite substrates and one LC layer disposed between the two substrates. In this case, the display panel 3 is a convex type display panel. That is, the changing rates of tangent angle of the substrates, LC layer and polarizers are substantially the same as that of the first arc-shaped fixing member 21 and the second arc-shaped fixing member 22. In some embodiments, the changing rates of tangent angle of the first arc-shaped fixing member 21 and the second arc-shaped fixing member 22 may be a little different.

Referring to FIGS. 1D and 1E, the light emitting unit 25 is disposed between the optical element 23 and the first arc-shaped fixing member 21. The light emitting unit 25 has a substrate 251 and a plurality of lighting elements 252. The lighting elements 252 are disposed on the substrate 251 in a 2D array, and the substrate 251 is disposed on the inner bottom surface 212 of the first arc-shaped fixing member 21. In this case, the light emitting unit 25 can be attached on the inner bottom surface 212 of the first arc-shaped fixing member 21 by an adhesive, so that it can substantially have the same changing rate of tangent angle as the first arc-shaped fixing member 21. In this embodiment, the substrate 251 is a flexible print circuit board, and the lighting elements 252 are LEDs. In addition, since the lighting elements 252 are disposed on the substrate 251 in a 2D array, the backlight module 2 may have the local dimming function. In other embodiments, it is also possible to use the first arc-shaped fixing member 21 and the second arc-shaped fixing member 22 to directly press the light emitting unit 25 so as to form the curved light emitting unit 25. This disclosure is not limited.

In addition, the reflective plate 26 of this embodiment has a plurality of holes 261 as shown in FIG. 1B. The holes 261 are disposed corresponding to the lighting elements 252, respectively. In this embodiment, the lighting elements 252 pass through the holes 261, respectively, so that the reflective plate 26 can be attached on the substrate 251. Besides, the reflective plate 26 can be disposed on an inner side surface 213 of the first arc-shaped fixing member (see FIG.

1D), and is located between the optical element 23 and the first arc-shaped fixing member 21. This configuration can enhance the light utilization. The reflective plate 26 includes a material with high reflectivity such as, for example but not limited to, metal (e.g. Ag), alloy, or the mixture of $TiO_2$ and resin. The reflective plate 26 can provide a reflective surface with high reflectivity, so that the backlight module 2 can have higher light utilization.

To be noted, as shown in FIG. 1E, the reflective plate 26 of this embodiment is a single-plate 3D reflective plate. Different from the reflective plate composed of multiple plates, two sides of the reflective plate 26 are curved portions with a curvature, and the top and bottom roulette have different lengths. Thus, the top and bottom of the reflective plate 26 can be naturally curved as being bended. In some embodiments, the reflective plate can also be composed of multiple plates (e.g. 3 plates), and this disclosure is not limited.

Furthermore, the display device 1 of this embodiment further includes a touch panel 4, which is disposed corresponding to the display panel 3 and located at one side of the display panel 3 away from the backlight module 2. Accordingly, the display device 1 is a curved touch display device. In other embodiments, the display device 1 can be configured without the touch panel 4.

In practice, the display panel 3 and the touch panel 4 can be shaped with a component (e.g. an arc glass) substantially having the same changing rate of tangent angle as the first arc-shaped fixing member 21 or the second arc-shaped fixing member 22. After shaping the display panel 3 and the touch panel 4 with the desired changing rate of tangent angle, the display panel 3 and the touch panel 4 are assembled with the backlight module 2 so as to compose the display device 1. In some embodiments, the changing rate of tangent angle of the display panel 3 and the touch panel 4 may be a little different from that of the backlight module 2 due to the process precision. In addition, the display panel 3, the touch panel 4 and the backlight module 2 are bonded and assembled by at least one adhesive member 6 (one or more adhesive members 6). In some embodiments, the display panel 3, the touch panel 4 and the backlight module 2 can also be assembled by other approaches.

As mentioned above, in the backlight module 2 of this embodiment, the second arc-shaped fixing member 22 is connected to the edge of the first arc-shaped fixing member 21, and the optical element 23 is disposed between the first arc-shaped fixing member 21 and the second arc-shaped fixing member 22 so as to form a curved surface. In addition, the optical film assembly 24 is disposed adjacent to the optical element 23, and the display panel 3 is disposed corresponding to the second arc-shaped fixing member 22 and the display is located at one side of the second arc-shaped fixing member 22 away from the optical element 23. Compared with the conventional display device, the backlight module 2 and the display device 1 of this disclosure have less supporting components and is easily assembled.

Figure 3A:
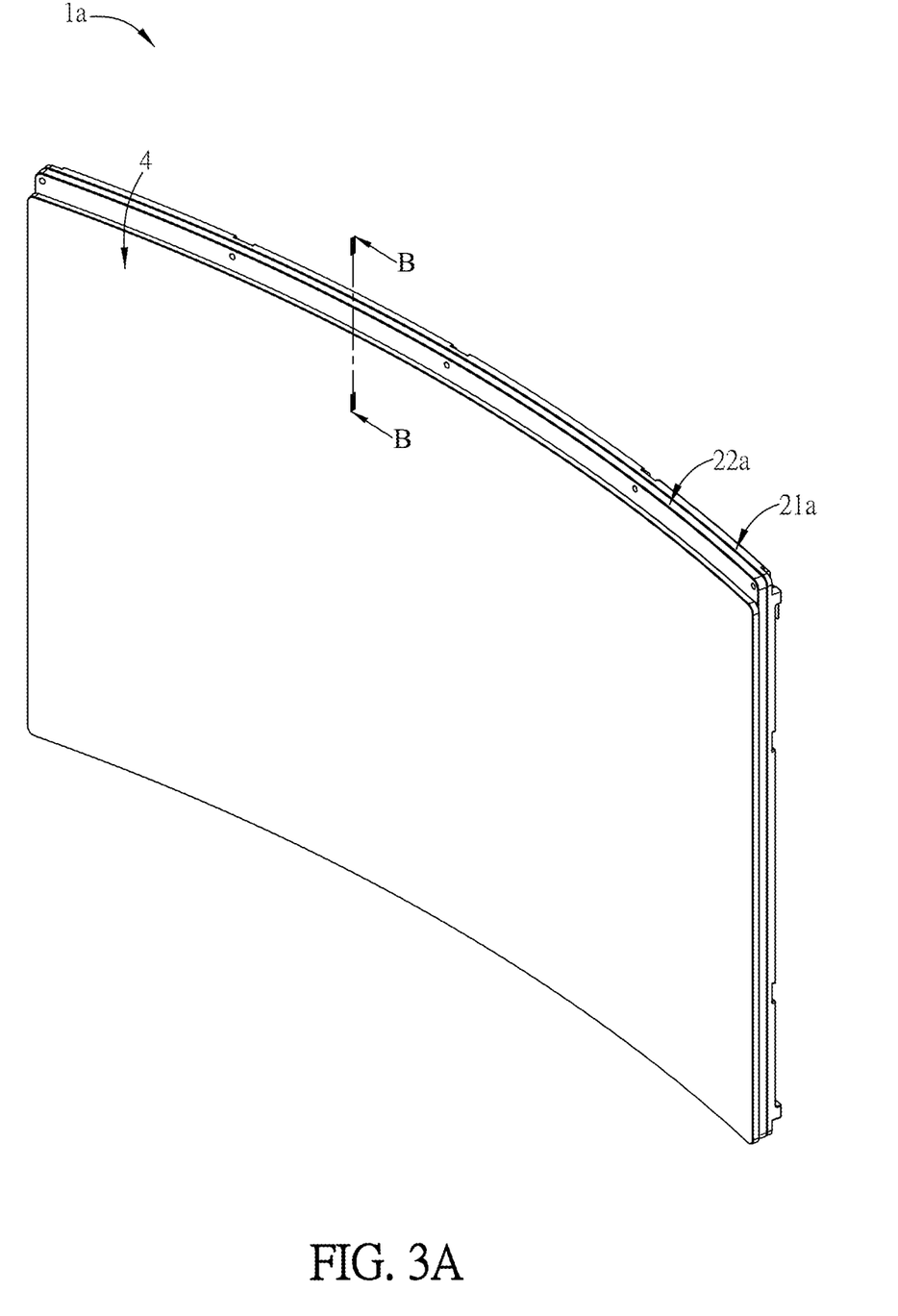
FIG. 3A is a perspective view of a display device according to another embodiment of the disclosure.
Figure 3B:
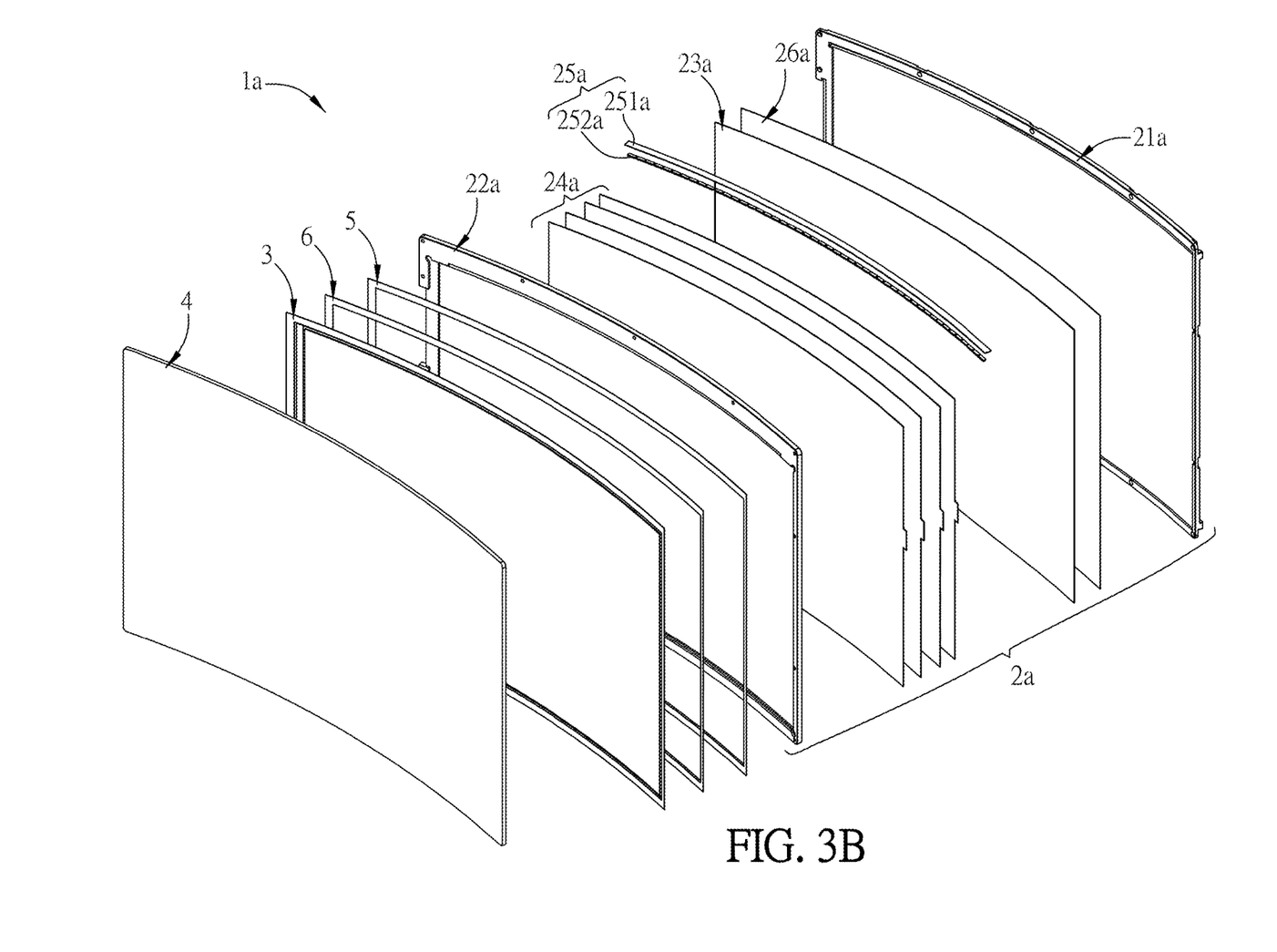
FIG. 3B is an exploded view of the display device of FIG. 3A.
Figure 3C:
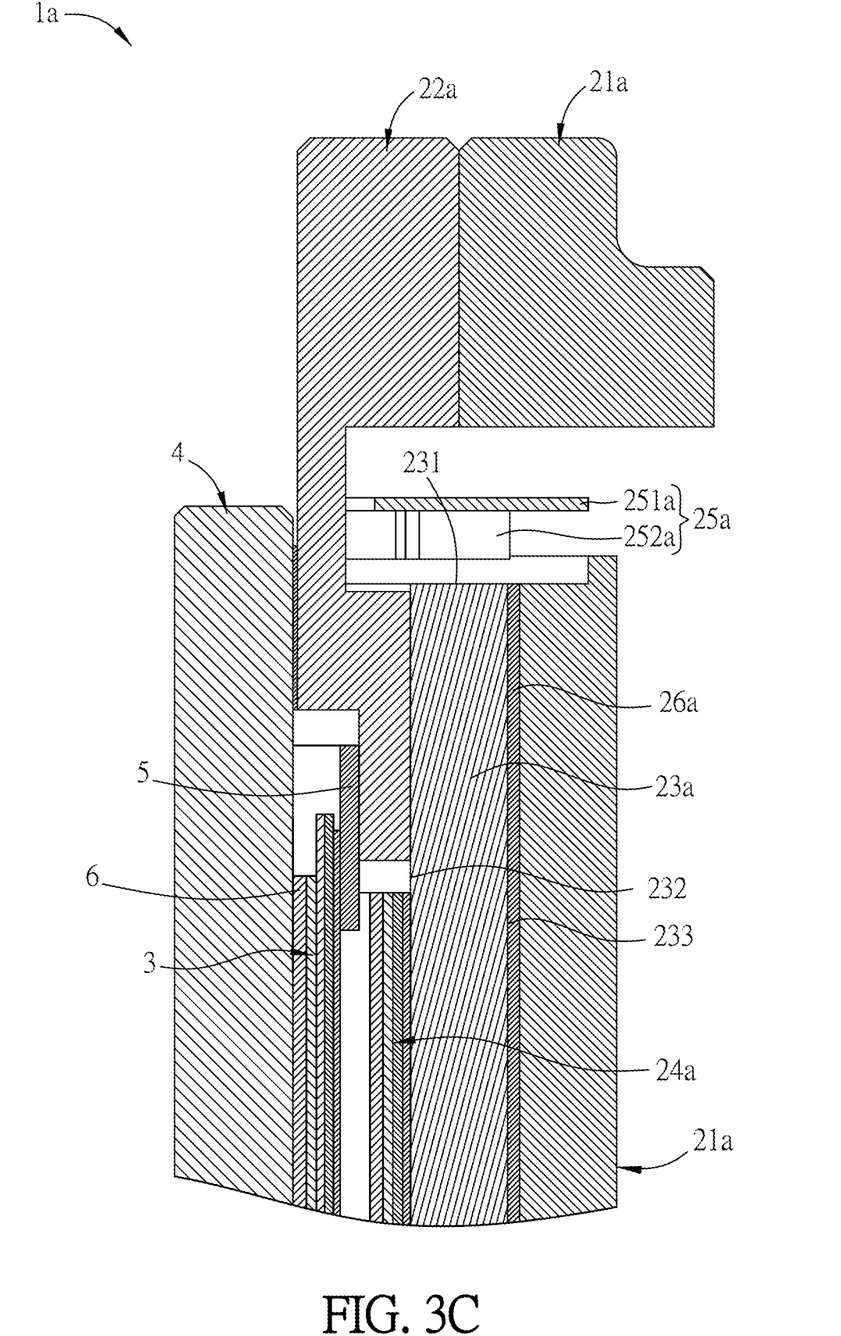
FIG. 3C is a sectional view of the display device of FIG. 3A along the line B-B.

FIG. 3A is a perspective view of a display device according to another embodiment of the disclosure, FIG. 3B is an exploded view of the display device of FIG. 3A, and FIG. 3C is a sectional view of the display device of FIG. 3A along the line B-B.

Different from the display device 1, the display device 1a of this embodiment is a concave type display device, and the backlight module 2a is an edge lighting backlight module. In this embodiment, the optical element 23a is a light guiding plate, which can be made of polycarbonate (PC) or polymethyl methacrylate (PMMA). The function of the light guiding plate is to guide the transmission direction of the light, and the light can travel inside the light guiding plate and be outputted through a light output surface of the light guiding plate so as to provide a uniform surface light source.

As shown in FIG. 3C, the optical element 23a has at least one light input surface 231, a light output surface 232 and a bottom surface 233, which is corresponding to the light output surface 232. The light input surface 231 and the light output surface 232 are adjacent surfaces, and the light output surface 232 faces toward the optical film assembly 24a. In addition, the light emitting unit 25a of this embodiment is a LED light bar and has a substrate 251a and a plurality of lighting elements 252a disposed on the substrate 251a. The light emitting unit 25a is disposed adjacent to the light input surface 231 of the optical element 23a. The light emitted from the light emitting unit 25a enters the optical element 23a through the light input surface 231, and then leaves the optical element 23a through the light output surface 232. In this case, the substrate 251a has an arc shape and is circuit substrate cooperated with the changing rate of tangent angle of the light output surface 231 of the optical element 23a. In this embodiment, one light emitting unit 25a is configured to corresponding one light input surface 231 of the optical element 23a. Of course, in other embodiments, it is possible to configure another light emitting unit 25a corresponding to another light input surface of the optical element 23a, and the another light input surface is corresponding to the light input surface 231. This disclosure is not limited.

In addition, the reflective plate 26a of the backlight module 2a is disposed between the optical element 23a and the first arc-shaped fixing member 21a, so that it can reflect the light outputted from the bottom surface 233 of the optical element 23a back to the optical element 23a. This configuration can enhance the light utilization. In this case, the reflective plate 26a includes a reflective layer with high reflectivity and is a single-plate reflective plate. Of course, in other embodiments, the reflective plate 26a can be composed of a plurality of plates.

The other technical features of the backlight module 2a and the display device 1a can be referred to the same components of the backlight module 2 and the display device 1, so the detailed descriptions thereof will be omitted.

To sum up, in the display device of this disclosure, the second arc-shaped fixing member is connected to the edge of the first arc-shaped fixing member, and the optical element is disposed between the first arc-shaped fixing member and the second arc-shaped fixing member so as to form a curved surface. In addition, the optical film assembly is disposed adjacent to the optical element, and the display panel is disposed corresponding to the second arc-shaped fixing member and located at one side of the second arc-shaped fixing member away from the optical element. Compared with the conventional display device, the display device of this disclosure has less supporting components and is easily assembled.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure. To be noted, the features of the above-mentioned embodiments can be optionally selected and combined depending on the designs and requirements, and this disclosure is not limited.

What is claimed is:

1. A display device, comprising:
   a first arc-shaped fixing member;
   a second arc-shaped fixing member disposed corresponding to the first arc-shaped fixing member, wherein the second arc-shaped fixing member is connected to an edge of the first arc-shaped fixing member;
   an optical element disposed between the first arc-shaped fixing member and the second arc-shaped fixing member and forming a curve surface;
   an optical film assembly disposed adjacent to the optical element; and
   a display panel disposed corresponding to the second arc-shaped fixing member and located at a side of the second arc-shaped fixing member away from the optical element;
   wherein the edge has a protrusion portion which protrudes and extends substantially parallel to the optical element outwardly from an outer side wall of the first arc-shaped fixing member, and the second arc-shaped fixing member is connected to the protrusion portion.

2. The display device of claim 1, wherein a changing rate of a tangent angle of the first arc-shaped fixing member is substantially the same as a changing rate of the second arc-shaped fixing member.

3. The display device of claim 1, wherein the first arc-shaped fixing member and the second arc-shaped fixing member are connected by screwing, hooking or riveting.

4. The display device of claim 1, wherein the second arc-shaped fixing member has a hollow center portion.

5. The display device of claim 1, wherein the first arc-shaped fixing member or the second arc-shaped fixing member is integrally formed as one piece.

6. The display device of claim 1, wherein the optical element is a diffuser or a light guiding plate, and a peripheral edge of the optical element is disposed between the first arc-shaped fixing member and the second arc-shaped fixing member.

7. The display device of claim 1, wherein the optical element has a curved shape, and a changing rate of a tangent angle of the optical element is substantially the same as a changing rate of a tangent angle of the first arc-shaped fixing member or the second arc-shaped fixing member.

8. The display device of claim 1, further comprising:
   a light emitting unit, wherein the optical element has a light input surface and a light output surface connecting to the light input surface, the light output surface faces the optical film assembly, the light emitting unit is disposed adjacent to the light input surface; and
   a reflective plate disposed between the optical element and the first arc-shaped fixing member.

9. The display device of claim 1, wherein the display device is a curved display device.

10. The display device of claim 1, further comprising:
    a touch panel disposed corresponding to the display panel and located at one side of the display panel away from the optical element.

11. The display device of claim 10, wherein the touch panel is a curved touch panel.

12. The display device of claim 1, wherein the optical film assembly comprises a first optical film and a second optical film, and the first optical film is disposed between the optical element and the second optical film.

13. The display device of claim 12, wherein when the display device is a convex type display device, a longest dimension of the first optical film is less than or equal to a longest dimension of the second optical film.

14. The display device of claim 12, wherein when the display device is a concave type display device, a longest dimension of the first optical film is greater than or equal to a longest dimension of the second optical film.

15. The display device of claim 1, further comprising:
    a light emitting unit disposed between the optical element and the first arc-shaped fixing member, wherein the light emitting unit comprises a substrate and a plurality of lighting elements, the lighting elements are disposed on the substrate, the first arc-shaped fixing member has an inner bottom surface, and the substrate is disposed on the inner bottom surface.

16. The display device of claim 15, wherein the substrate is a flexible print circuit board.

17. The display device of claim 15, further comprising:
    a reflective plate having a plurality of holes, wherein the holes are disposed corresponding to the lighting elements, respectively, and the lighting elements pass through the holes, respectively, and the reflective plate is disposed on the substrate.

18. The display device of claim 17 wherein the reflective plate is further disposed on an inner side surface of the first arc-shaped fixing member, and is located between the optical element and the first arc-shaped fixing member.

19. The display device of claim 17, wherein the reflective plate is a single-plate 3D reflective plate.

\* \* \* \* \*